United States Patent [19]

Funkhouser

[11] 4,401,266

[45] Aug. 30, 1983

[54] METHOD FOR THE DISTRIBUTION OF BIOLOGICALLY ACTIVE CHEMICALS

[75] Inventor: William A. Funkhouser, Buckeye, Ariz.

[73] Assignee: Albany International Corporation, Albany, N.Y.

[21] Appl. No.: 308,448

[22] Filed: Oct. 5, 1981
[51] Int. Cl.$^3$ .............................................. B05B 17/04
[52] U.S. Cl. ......................................... 239/7; 239/665
[58] Field of Search ................... 239/7, 675, 681, 682, 239/380, 665, 666

[56] References Cited

U.S. PATENT DOCUMENTS 3,994,437 11/1976 Kitterman ....................... 239/172 X
4,262,846 4/1981 Funkhouser ........................... 239/1

*Primary Examiner*—John J. Love
*Assistant Examiner*—Mary McCarthy
*Attorney, Agent, or Firm*—Gregory J. Nelson

[57] ABSTRACT

A method and apparatus for broadcast dispersion of biologically active encapsulated dispensers over preselected areas in a preselected pattern which utilizes a primary rotating applicator. The apparatus includes a hopper for the encapsulated dispensers and means for moving the dispensers onto a surface of the primary applicator from there to be discharged tangentially. A "sticker" substance is mixed with the dispensers. The distribution pattern is modified by one or more secondary directional spreaders located adjacent the primary applicator which serve to deflect and re-direct the dispensers.

5 Claims, 9 Drawing Figures

METHOD FOR THE DISTRIBUTION OF BIOLOGICALLY ACTIVE CHEMICALS

The present invention relates to an apparatus and method for chemicals and more particularly to a method and apparatus for the ground or airborne dispersion and application of biologically active chemicals of the ultra low volume type (ULV).

For many years various biologically active chemicals, such as insecticides, fungicides, herbicides and fertilizers have been disseminated or distributed by broadcast techniques over large areas of cropland, forest and fields. Application rates of these chemicals has been relatively high, sometimes these chemicals are applied at the rate of several hundred pounds or gallons per acre. For example, since its introduction after World War II and recently the compound known as dichloro-diphenyl-trichloroethane (DDT) was one of the most significant chemicals used in insect control. DDT and other similar chlorine derivatives such as chlordane, aldrin, toxaphene and phosporous based insecticides such as parathion and malathion were widely and indiscriminately distributed by aircraft or tank-spraying devices. However since these chemicals degrade or breakdown very slowly, use of these chemicals has been restricted and in some cases entirely banned because of the long-term environmental effects.

Accordingly, agriculturists have turned to other methods of insect control. Entomologists and agricultural scientists have developed new chemicals and biological controls. For example, hormones are commonly used which affect the growth of insects. Pheromones have also been developed which elicit specific responses in certain insect species. The pheromone exuded by female insects may draw males of the same species from a large area. Capitalizing on the attraction of sex pheromones for specific species, pest control experts have been using these compounds to lure insects into traps where they can be killed or counted to help entomologists determined whether further anti-pest activities such as applications of conventional insecticides may be necessary. Thus, the behavior of various insect species can be effectively regulated by providing an appropriate pheromone at a selected location in a crop, field or otherwise geographical area.

One pheromone is designated "Gossyplure H.F." which is a trademark of Conrel, an Albany International Corporation, is an attractant for the pink bollworm moth which disrupts the mating cycle of the moth. This pheromone may be applied in a quantity as small as one gram per acre. Similarly, pheromones such as Frontalin have been isolated for attracting pine beetles for the control of this insect. These new substances are often designated ultra low volume (ULV) chemicals and are often in the form of plastic dispensers which may be hollow and which encapsulate the biologically active chemical.

The use of these new chemicals has required the development of new equipment and apparatus for disseminating these substances. Conventional dispersion methods are not adaptable for use with the new compounds. For example, pheromones are often applied at the rate of several grams per acre. U.S. Pat. No. 3,994,437 entitled "Broadcast Dissemination of Trace Quantities of Biologically Active Chemicals", commonly assigned with the present application, discloses certain apparatus for disseminating these chemicals in which the chemicals are conveyed to a distributor in an air conduit. The apparatus shown in the aforementioned application has been successful and is satisfactory for many applications. However, in some instances other means of dispensing minute or trace quantities of these biologically active materials are necessary. Since the substances are spread in relatively small quantities, conventional agricultural vehicles are not well-suited for the distribution of these substances. Accordingly, it is highly desirable to provide an improved method and apparatus useful for evenly and accurately dispensing and disseminating minute quantities of biologically active materials of the ULV type such as insect pheromones encapsulated in a dispenser in order to increase the effectiveness of the chemical and to reduce quantities of the chemicals required to obtain a given effect.

A further development of specialized techniques for ground or airborne dispersion of ULV chemicals is found in Pat. No. 4,262,846 issued Apr. 21, 1981 to the present inventor and entitled "Method For The Distribution of Biologically Active Chemicals" nd commonly assigned herewith. This patent discloses a method for dispersing trace quantities of biologically active chemicals encapsulated in a microdispenser which method utilizes a rotating applicator device. The disclosed apparatus shows a hopper for receiving the encapsulated chemicals and a transfer tube for conveying the chemicals to the applicator device. A sticker substance such as a polybutadine is mixed or applied to the encapsulated chemicals. The applicating method involves rotating a conical distribution device at a predetermined speed. The encapsulated chemicals are deposited on the interior surface of the rotating conical distributor along with the sticker substance. The coated materials are moved along the cone and are discharged from the end of the cone generally tangentially to the axis of the distribution device to be spread over the area to be treated.

The above described method represents a substantial advance in the state of the art. However, the distribution device and method described in the subject patent spreads the material in a 360 degree radius. In some instances, particularly in ground applications, it is desirable to modify the distribution pattern so that material is not spread in a complete 360 degree pattern. For example, with a dispersion device mounted on the ground it is not generally desirable to spread the biologically active material in the furrows between the crop rows.

Briefly, in accordance with the present invention a method and apparatus for broadcast dispersion of trace quantities of biologically active materials over preselected areas in a preselected pattern is provided. The apparatus includes a hopper for containment of the chemicals and means for transferring the chemicals from the hopper to a primary distributor. Preferably, the primary distributor dispersion device is in the form of a truncated cone rotating at a predetermined speed. The material is transferred to the interior surface of the cone and is moved along the interior surface and discharged tangentially from the cone. A sticker substance, such as polybutadine, may be applied directly to the material in the hopper and mixed with the microdispensers or may be metered into the material as it is transferred from the hopper to the distributor. The distribution pattern is modified by one or more secondary directional spreaders located adjacent the primary distribution device. The secondary spreaders are rotated at a predetermined speed generally in a rotational direction opposite that of the primary cone. A portion of the discharge from the primary dispersion device strikes the secondary device and is re-directed modifying the distribution pattern to create the desired pattern. The apparatus and method may be adapted for ground applications or for use with airborne dispersion using fixed and rotary wing aircraft.

The above and other objects and advantages of the present invention will become more apparent from the following description, claims and drawings in which:

The biologically active chemical is encapsulated for use in a microdispenser by any of several convenient techniques known to persons skilled in the art. For example, the chemical can be encapsulated within a permeable integement according to the general technique described in the U.S. Pat. No. 3,539,465 and U.S. Pat. No. 3,577,515 or within zero-order release devices of the general type disclosed in U.S. Pat. No. 3,851,648. The biologically active chemical can be contained or encapsulated in a laminated microdispenser such as the material known as Hercon which contains a porous chemical containing layer between two outer laminae. The material may also be a hollow fiber containing a pheromone such as the type sold by Conrel, an Albany International Company, under the trademark "Gossyplure H.F." in which a pheromone is contained by sealing or by capillary action within a hollow fiber. These hollow filament conduits are known in the art and may be made from any one of a number of natural or synthetic polymeric materials. Useful materials include polyesters, polyolefins, acrylics, modacrylics, polyamides and the like. The selection of the appropriate encapsulating material will be governed by considerations of chemical compatibility or inertness of the fiber material with the chemical agent and formulation to be incorporated and released from the filament. Thus, the microdispenser may be selected from a wide range of materials and may take a wide range of shapes and sizes and can contain a variety of biologically active materials. After the microdispensers have been filled with a biologically active material, they are ready for dissemination or distribution. For convenience, this general type of chemical will be referred to as "dispensers" in this application regardless of the specific chemical, type and shape of encapsulation involved.

Figure 1:
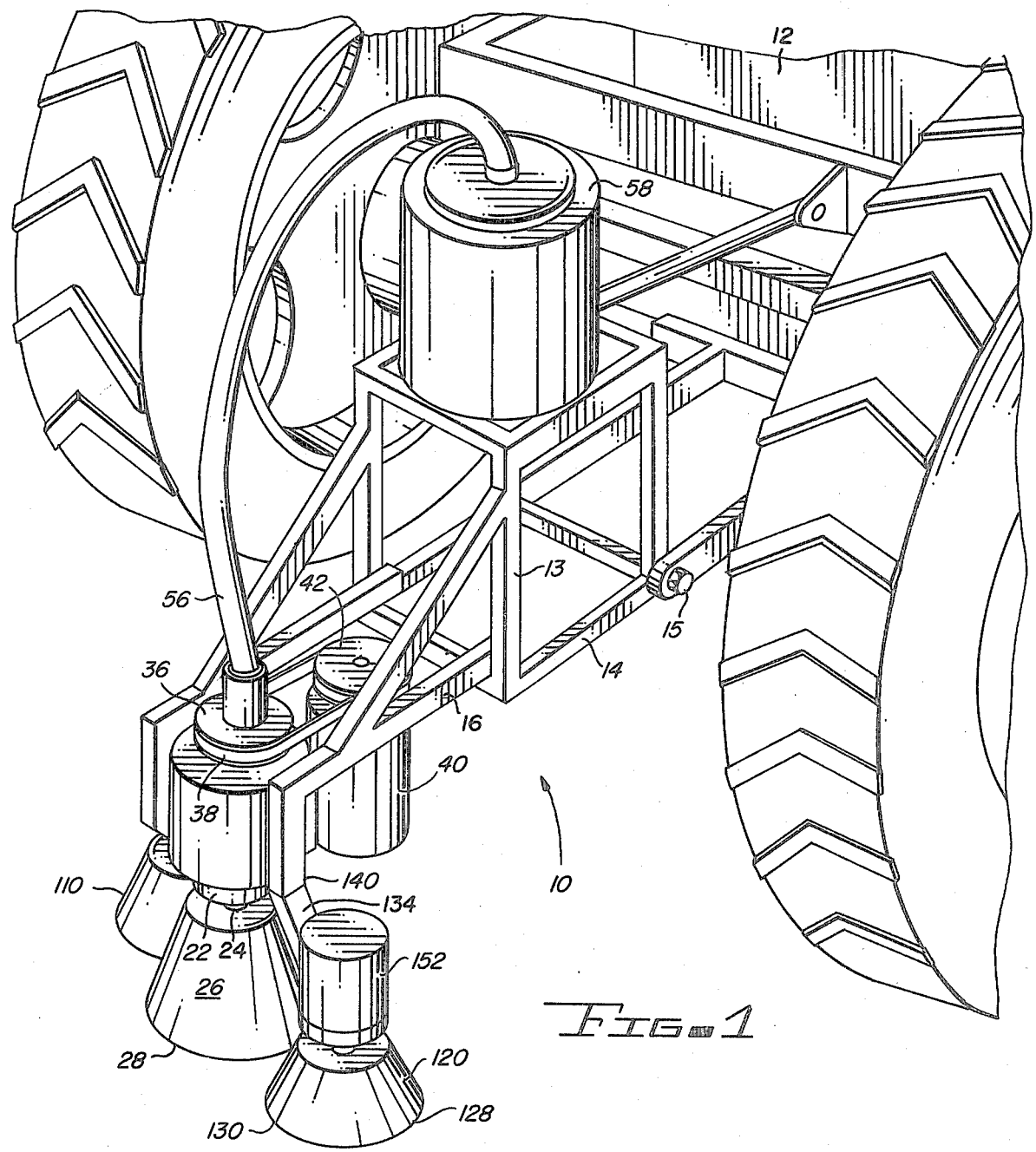
FIG. 1 is a perspective view of a preferred embodiment of the present invention shown in connection with a ground vehicle.
Figure 5:
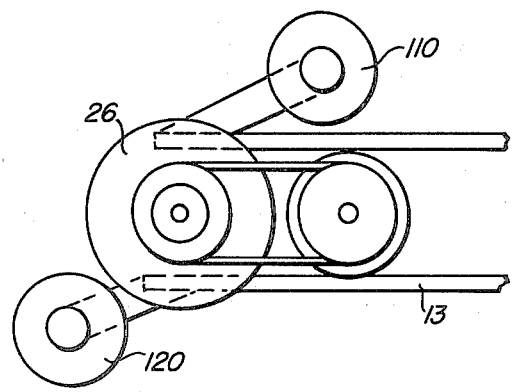
FIG. 5 is a plan view of a portion of the present invention illustrating the primary and secondary distribution devices.
Figure 6:
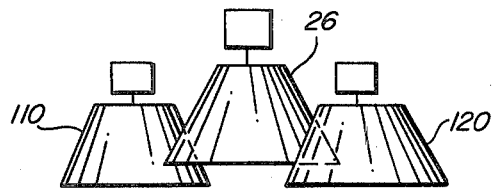
FIG. 6 is an elevated view of an alternate embodiment of the present invention.

Turning now to the drawings, FIGS. 1, 5 and 6 illustrate a preferred embodiment of the present invention showing one form of the apparatus developed for dispersing dispensers by ground application.

In FIG. 1 the apparatus 10 is shown attached to a ground vehicle 12 which may be a conventional tractor or may be a smaller hand-operated garden-type tractor. The dispersion device includes a mounting frame 13 which is shown being constructed from angle irons 14 securable to the frame of the tractor at pin connections 15. Rearwardly extending mounting brackets 16 are secured to the mounting frame 13. A bearing assembly 22 is secured near the lower end of brackets 16 and receives a cylindrical extension 24 of primary distribution cone 26. Cone 26 is truncated diverging outwardly from upper inlet end 25 toward discharge edge 28. Primary dispersion cone 26 has an interior surface 30 along which the dispensers travel and are discharged at lower edge 28 which may be slightly flared as shown.

Cone 26 is rotatively driven by pulley 36 through belt 38 connected to drive motor 40 having output pulley 42. Motor 40 may be of any conventional type and is shown as a DC motor which is connected to a suitable source of power such as electrical system of the tractor or a separate battery as is well known. The speed of rotation of the primary distribution device 26 may vary depending on the conditions of microdispensers to be distributed and typically will be in the range of about 2900 to 3600 r.p.m.

Figure 9:
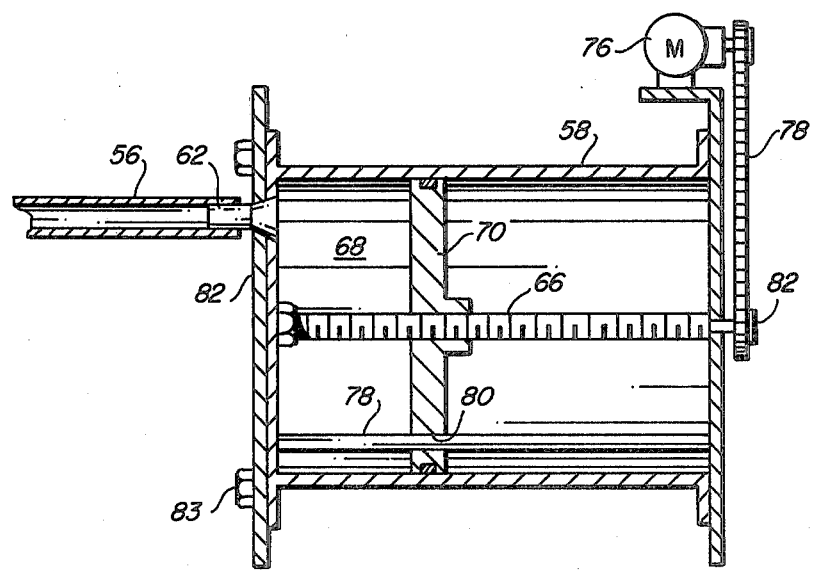
FIG. 9 is a cross-sectional view of the material containing hopper.

Transfer tube 46 extends vertically having discharge end 48 terminating at the intake end 25 of cone 26. Preferably tube 46 extends slightly into the interior of the cone so that microdispensers discharged from end 48 will be deposited directly on the interior surface 30 of the cone. A spreader bar 52 may be positioned adjacent discharge end 48 to serve to assist breaking any clumps of microdispensers that may emerge from the end of tube 48. The upper end 54 of delivery tube is connected by means of a flexible conduit 56 to a source of microdispensers shown as hopper 58. Hopper 58 as best seen in FIG. 9, is shown as being generally cylindrical having a discharge nozzle 62 connectable to flexible conduit 56. A lead screw 66 extends concentrically within chamber 68 within the cylindrical housing. Piston 70 is advanceable and retractable along lead screw 68. Lead screw 68 is reversibly driven by gearhead motor 76 through chain 78 and sprocket 82. Actuating the gear head motor in one direction of rotation will cause the lead screw to advance the piston 70 to discharge sticker material from outlet 62. In order to provide for even travel of the piston 70 through chamber 68, a guide rod 78 is positioned in parallel relationship to the lead screw and extend through a bore 80 within the piston 70.

Preferably chamber 68 is charged by removing cover plate 82 at retaining nuts 83 and filling the chamber with microdispensers as described. A suitable sticker material may also be mixed with the microdispenser. The particular sticker material used depends on the microdispensers and conditions including weather conditions. Typically, the sticker material is a polybutadine such as the material sold by Albany International under the trademark "Biotac I" or "Biotac II" which typically has a viscosity of 200,000 centipoises at 70 degrees F.

Figure 2:
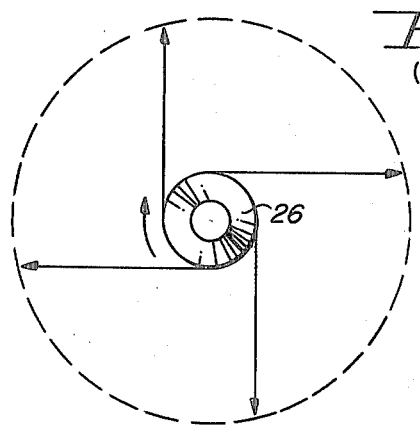
FIG. 2 is a plan view illustrating the dispersion pattern of prior art devices.

Transfer tube 46 delivers the material to the dispersion cone assembly depositing material, preferably mixed with an adhering sticker material, to the inlet or end 25 of the primary dispersion device. As in more fully explained in U.S. Pat. No. 4,262,846, the conical dispersion device is rotated at high speed to urge the coated microdispensers along the interior surface 30 of the cone where the dispensers are ejected at edge 28 in a generally tangential path with respect to the cone as best seen in FIG. 2. For airborne applications, the forward motion of the aircraft produces rearwardly flowing airstream which will tend to deflect the moving microdispensers to a horizontal direction. However, with ground applicators, the fiber pattern as shown in FIG. 2 is not always desirable. Accordingly, it is often desirable to modify the fiber distribution pattern so that areas occupied by the furrows and the path along which the ground applicator or ground vehicle travels is not within the pattern.

To this end, the present invention contemplates the addition of one or more secondary directional dispersion devices or spreaders. These devices are shown in FIG. 1 as a pair of rotating, generally conical shapes 110 and 120 having a diameter less than the major diameter of primary dispersion device 24. The secondary directional spreaders 110 and 120 are preferably located immediately adjacent the primary spreader with the primary and secondary spreaders all having their axes of rotation in parallel relationship. Each of the secondary spreaders 110 and 120 consists of a generally conical member body 128 having an outer wall 130. Devices 110 and 120 are each positioned so that the discharge edge 28 of the primary dispersion device 24 projects horizontally within the vertical dimension of the side wall as best seen in FIG. 6. Thus, a portion of the material ejected tangentially from the lower edge of cone 28 will strike the adjacent secondary directional spreaders 110 and 120. Each of the spreaders 110 and 120 are mounted on arms 134 swingably attached to frame 16 at pivot 140.

Secondary dispersion devices 110 and 120 each are rotatably driven through the motors 152 which may be electric, hydraulic or pneumtic.

The primary dispersion cone is rotated at varying speeds depending upon conditions and the microdispensers to be distributed but typically is rotated in an approximate range of 2900 to 3600 r.p.m.s. The secondary distributors generally have a diameter less than that of the primary distributors.

Figure 3:
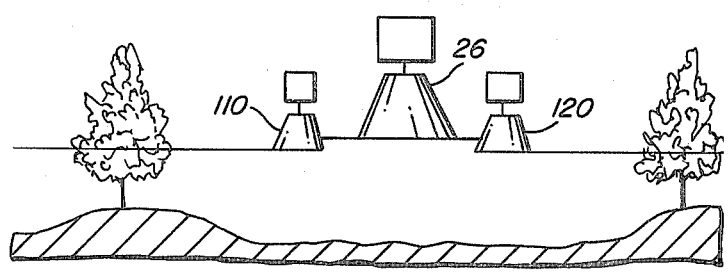
FIG. 3 is an elevational view showing the primary and secondary distribution devices and the distribution pattern of the present invention.
Figure 4:
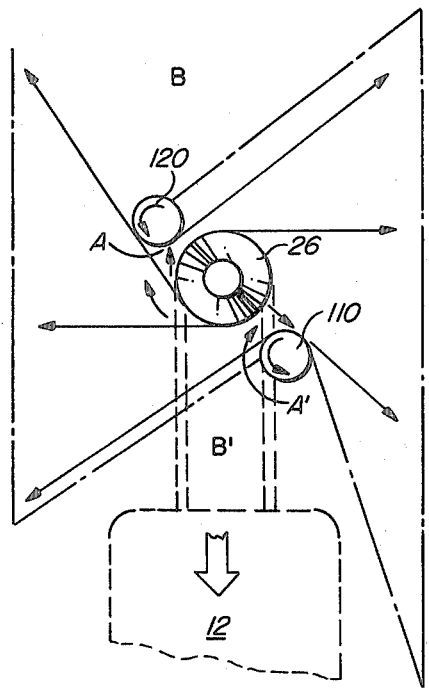
FIG. 4 is a plan view illustrating the modified distribution pattern of the present invention.

The dispersion pattern as shown in FIG. 2 is modified as shown in FIGS. 3 and 4 when the secondary directional spreaders are utilized. The dispensers ejected from the primary cone within the regions indicated A and A', strike the secondary dispersion cones 120 and 110 respectively. The secondary cones are rotated in a direction opposite to the rotation of the primary dispersion cone. The dispensers striking the surface of the secondary cone are redirected as shown so that a shadow area B and B' is created. If the cones are mounted on a ground distribution device as shown in FIG. 4 and the direction of travel is as indicated by the arrow, the ground vehicle would align with the furrows so that areas B and B' would be coincidental with the furrows. Thus, dispensers would not be deposited between the crop rows in the furrow and a minimum of two opportunities for the fiber to impact foilage in the row of crops is presented.

The size of the shadow area, B and B' can be increased and decreased by increasing and decreasing the size of the secondary directional spreaders in relationship to the size of the primary spreader. The larger the secondary directional spreaders the greater the width of the area devoid of microdispensers. Thus, by controlling the relative size of the primary directional spreaders and the position of the secondary directional spreaders in relation to the primary spreader, almost any desired pattern for row crops and the like can be achieved. For example, when the secondary directional spreaders approach the diameter and size of the primary spreader create a larger shadow effect in the distribution pattern results.

Figure 7:
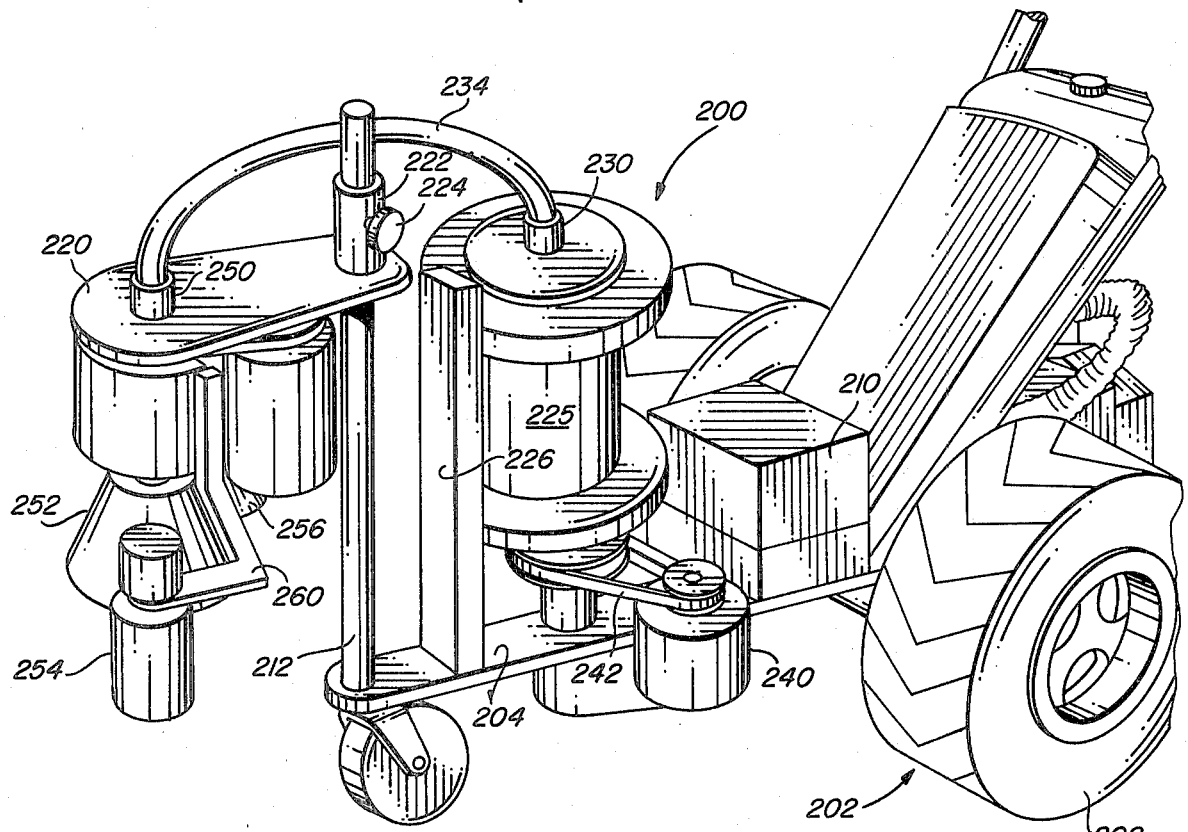
FIG. 7 is a perspective view illustrating an alternate embodiment of the present invention.
Figure 8:
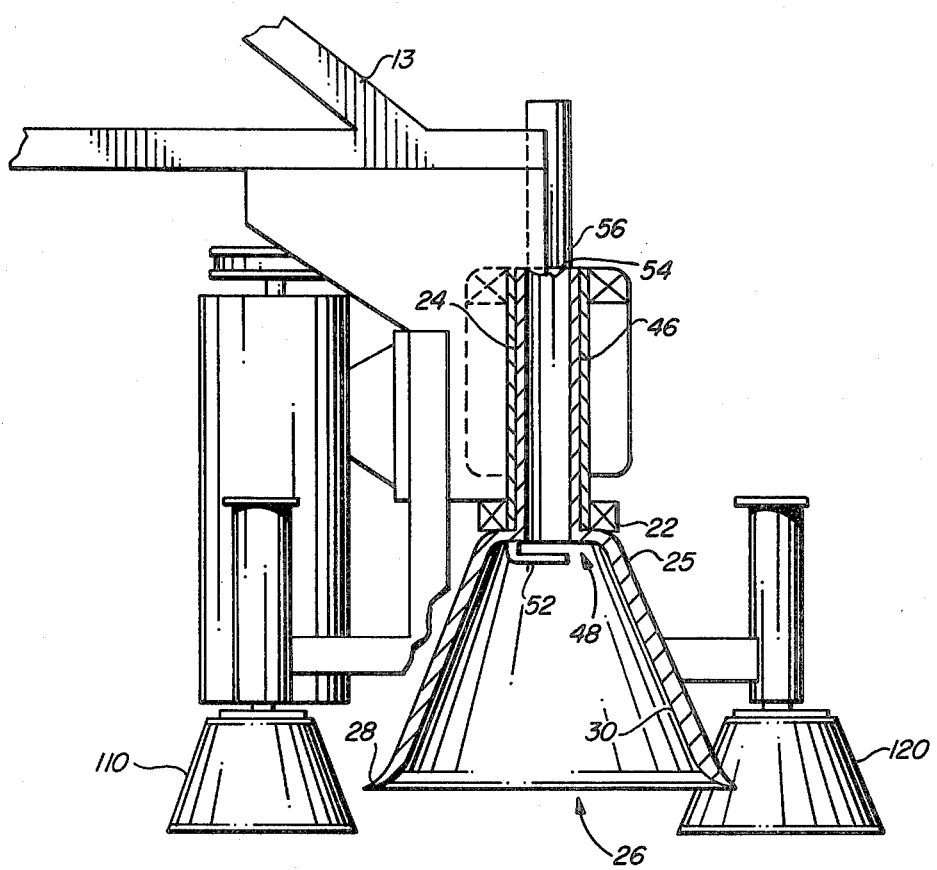
FIG. 8 is a cross-sectional view of the primary distribution cone.

FIG. 7 illustrates an alternate embodiment of the present invention generally designated by the numeral 200. The directional spreader is shown in conjunction with ground application vehicle 202 which includes a horizontal frame member 204 adapted to traverse the ground having front steering wheel 206 and rear drive wheels 208. Ground application vehicle 202 is powered by conventional prime mover 210 such as an internal combustion engine. Post 212 extends vertically at the front of frame member 204. Mounting plate 220 is vertically slideable along post 212 at slide 222 which may be locked at any desired elevation by locking screw 224.

The supply of microdispensers is contained in hopper 225 which is secured to vertical support bracket 226. Hopper 225 is as has been described with reference to FIG. 9 having a piston advanceable within the hopper to discharge microdispensers at a controlled rate at outlet 230 into conduit 234. The piston is advanceable under the influence of electric motor 240 which advances the piston through a belt and pulley arrangement 242.

Conduit 234 is connected to intake 250 which discharges into the intake end of the rotatable primary distribution member 252. A pair of secondary distribution members 254 and 256 are mounted adjacent primary distribution member 254 and arms 260. Arms 260 may be fixed so that the center of the primary and secondary distribution members are on a common line or may be pivotal so the relative position of the secondary distribution members can be adjusted to create the desired distribution pattern. In the spreader of the embodiment shown in FIG. 7, the secondary distribution member 254 and 256 are shown as being generally cylindrical. As described above, when the microdispensers are ejected generally tangentially from the lower end of the primary distribution member 252, a portion of the dispensers strike the adjacent secondary distribution members and are re-directed to modify the distribution pattern to create a shadow or a void of certain areas where it is desired that no dispensers be distributed.

The embodiment of FIG. 7 is to be particularly applicable to relatively small application areas and the secondary distribution members can be located to prevent microdispensers from being distributed in the furrows between the crop rows.

The secondary distribution device may have varying geometric shapes depending on the distribution pattern that is desired. While the shapes, frusto-conical and cylindrical, have been specifically described, others may also be used and the term "geometrical surface" has been used to include other geometric forms of the secondary distribution devices.

It will be obvious to those skilled in the art to make various changes, alterations and modifications to the method and apparatus described herein to the extent that these changes, alterations and modifications do not depart from the spirit and scope of the appended claims they are intended to be encompassed therein.

I claim:

1. A method for distributing biologically active chemicals of the low-volume type encapsulated in dispenser, said method comprising:
   (a) applying a sticker to the dispensers to coat the dispensers to facilitate attachment to living organisms in the area;
   (b) transferring the coated dispensers to a surface of a rotating primary distribution device, said distribution device upon rotation causing said dispensers to be discharged at a discharge location from said primary distribution device in a broadcast pattern; and
   (c) interposing a secondary distribution device within the broadcast pattern of the primary distribution device, said secondary distribution device having a rotating geometrical surface which intercepts at least a portion of the discharged dispensers causing them to be deflected and re-directed thereby altering the normal pattern of the primary distribution device.

2. The method of claim 1 wherein the geometrical surfaces of said primary and secondary distribution devices are generally conical.

3. The method of claim 1 wherein said primary distribution device is generally conical and wherein said secondary distribution device is generally cylindrical in configuration.

4. The method of claim 1 wherein said secondary distribution device is arranged having an axis parallel to the axis of the primary distribution device and wherein said axis lie aling a single lane.

5. The method of claim 4 wherein the relative position of said secondary distribution device with respect to said primary distribution device is adjustable.

* * * * *